Jan. 16, 1934.   J. G. PAULIN   1,943,393
MEASURING AND REGISTERING INSTRUMENT
Filed May 21, 1930
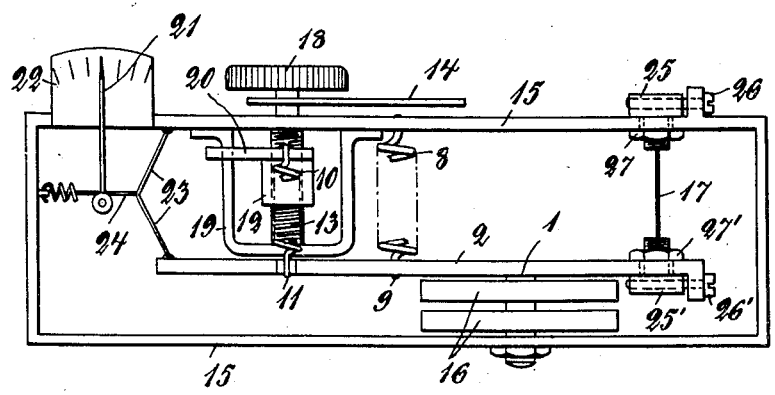
Inventor:
Josua Gabriel Paulin
By
Pennie Davis Marvin & Edmonds
Attorneys Patented Jan. 16, 1934

1,943,393

UNITED STATES PATENT OFFICE 1,943,393

MEASURING AND REGISTERING INSTRUMENT

Josua Gabriel Paulin, Eskilstuna, Sweden

Application May 21, 1930, Serial No. 454,371, and in Sweden June 3, 1929

3 Claims. (Cl. 73—4)

The present invention relates to instruments for measuring or registering variable forces, by way of example gas pressures. More particularly it releates to instruments of this kind which are adapted to be read off or automatically to record according to the so called zero method, and which are provided with a measuring member adapted to be moved in response to said forces, said measuring member being also influenced by an opposing force, the magnitude of which may be adjusted by means of a zeroizing mechanism for the purpose of setting the measuring member in a zero position at the reading of the instrument. The magnitude of the zeroizing movements, which must be communicated to the zeroizing mechanism in order to bring the measuring member to its zero position, then serves as a measure of the variations of the force to be measured.

The object of this invention is to provide an improvement on instruments of this kind which will make it possible to change the measuring range of the instrument. To this end, the counter-acting force, caused by an adjustment spring system, is applied to the measuring member through the medium of a lever, which is adjustably mounted in the frame in such a way that the ratio of gearing through which the counter-acting force is transferred to the measuring member, i. e. the ratio between the lengths of the arms of the lever, may be changed by displacing the pivotal point of the lever.

The invention will be described with reference to the accompanying drawing which illustrates one embodiment thereof.

In the embodiment shown, the measuring member consists of a system of membrane boxes 16 connected in series and mounted on the frame 15. The free membrane of the system is at 1 connected to a lever 2 which at its one end is supported in the frame by suspension in a flexible band 17 or the like. The counter-acting force is caused by a spring system consisting of springs 8 and 10. The spring 8 is connected to the lever 2 at a point 9 and balances a certain lower limit value of the force to be measured, while the tension of the spring 10 may be varied for the purpose of setting the measuring member in its zero position. Said spring 10 is with its one end connected to the lever 2 at a point 11 and with its other end connected to a nut 12, which is in threaded engagement with a micrometer-screw 13 supported in the frame.

The micrometer-screw 13 is with its lower end supported in a fixed bail 19, one leg of which serves as a guide for an arm 20 projecting from the nut 12. The tension of the spring 10 is varied by turning the micrometer-screw 13 by means of a handle 18. The micrometer-screw carries a pointer 14 which on a fixed scale indicates the magnitude of the turning of the micrometer-screw. Instead of a single adjustable spring 10 two springs may be used arranged symmetrically in respect to the micrometer-screw and connected to the nut 12 at opposite sides.

The movements of the membrane are transferred to the tendency pointer 21 partly through the lever 2, partly through an elastic band system connected between said lever and the tendency pointer 21, the deviations of said membrane being indicated by means of said pointer 21 on a fixed scale 22. The band system comprises a band 23, stretched at an angle between the free end of the lever and a point on the frame, and also a band 24. The band 24 is with its one end fastened to the point of the angle, is wound about the pointer shaft, and is with its other end connected to a spring fastened to the frame, which spring keeps the band system stretched.

In the drawing the lever 2 is shown in the position which it should occupy when the instrument is read. The membrane is then set in its middle position and the tendency pointer 21 points to the zero line on the scale 22. The pressure prevailing at the moment is then indicated by the pointer 14 on the corresponding scale.

For the purpose of altering the measuring range of the instrument the points for fastening the suspension band 17 of the lever 2 are adapted to be adjusted. The upper point for fastening the band consists of a piece 25, adjustable by means of an adjusting screw 26 along a guiding slot or the like in the frame 15, the guiding slot being parallel with the lever 2. The piece 25 may be locked in the adjusted position by means of a locknut 27. The lower point for fastening the band also consists of a similar piece 25' displaceable along a corresponding guiding slot in the lever 2. The piece 25' may be locked in the adjusted position by means of a locking nut 27'.

The shown embodiment of an instrument according to the invention is, of course, to be considered only as an example illustrating an application of the invention. Instead of supporting the lever 2 through suspension by means of a flexible band, the lever may of course be supported by a common bearing, by way of example of the knife-edge and seat type, in which case the knife-edge and seat may be displaceable similarly to the points 25', 25' for fastening the band.

I claim:

1. In an instrument for measuring variable forces, a measuring member adapted to be moved in response to said forces, a lever connected with said measuring member, a spring-system connected with said lever for counter-acting the forces to be measured, a zero-izing mechanism for adjusting the magnitude of the counter-acting spring power so as to balance the forces to be measured, and separate means for displacing the pivotal point of the lever to thereby vary the ratio between the lengths of the arms of the lever.

2. In an instrument for measuring variable forces, a measuring member adapted to be moved in response to said forces, a lever connected with said measuring member, a flexible member connecting a point of said lever with a stationary point of the instrument for providing a frictionless pivotal suspension of the lever, a spring-system connected with said lever to counter-act the forces to be measured, a zero-izing mechanism for adjusting the magnitude of the counter-acting spring power to thereby balance the forces to be measured, and means for displacing the point of connection of said flexible member with the lever whereby to vary the ratio between the length of the arms of the lever.

3. In an instrument for measuring variable forces, a measuring member adapted to be moved in response to said forces, a lever connected with said measuring member, a tendency-pointer, a frictionless-system consisting of flexible members for connecting the tendency pointer with the lever, a spring-system connected with said lever for counter-acting the forces to be measured, a zero-izing mechanism for adjusting the magnitude of the counter-acting spring power to thereby balance the forces to be measured, and separate means for displacing the pivotal point of the lever whereby to vary the ratio between the length of the arms of the lever.

JOSUA GABRIEL PAULIN.